US011846292B2

(12) United States Patent
Götzinger et al.

(10) Patent No.: US 11,846,292 B2
(45) Date of Patent: Dec. 19, 2023

(54) METHOD FOR DETERMINING THE OPERATING POINT

(71) Applicant: ebm-papst Mulfingen GmbH & Co. KG, Mulfingen (DE)

(72) Inventors: Marvin Götzinger, Buchen-Götzingen (DE); Erik Reichert, Boxberg (DE); Marco Weckert, Bad Mergentheim (DE); Ralph Wystup, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 348 days.

(21) Appl. No.: 16/970,684

(22) PCT Filed: Feb. 26, 2019

(86) PCT No.: PCT/EP2019/054769
§ 371 (c)(1),
(2) Date: Aug. 18, 2020

(87) PCT Pub. No.: WO2019/166448
PCT Pub. Date: Sep. 6, 2019

(65) Prior Publication Data
US 2020/0378392 A1    Dec. 3, 2020

(30) Foreign Application Priority Data
Feb. 27, 2018   (DE) .................... 10 2018 104 394.5

(51) Int. Cl.
*F04D 25/08*        (2006.01)
*F04D 27/00*        (2006.01)
(52) U.S. Cl.
CPC ........... *F04D 25/08* (2013.01); *F04D 27/004* (2013.01)

(58) Field of Classification Search
CPC ......... F04D 27/00–001; F04D 27/0261; F04D 27/004; F04D 27/008; F04D 27/0292; F04D 15/0066; F04D 15/0088; F04D 15/0094; F04D 15/0245; F04D 15/0281; F04D 25/08; F04D 25/06; F04B 2203/0209
USPC ...................................... 417/42, 44.1, 44.11
See application file for complete search history.

(56) References Cited

U.S. PATENT DOCUMENTS

| | | | |
|---|---|---|---|
| 5,743,715 A | 4/1998 | Staroselsky et al. | |
| 2009/0180897 A1 | 7/2009 | Liao et al. | |
| 2011/0200454 A1 | 8/2011 | Ahonen et al. | |
| 2012/0251340 A1* | 10/2012 | Ahonen | G01F 25/13 |
| | | | 417/53 |

(Continued)

FOREIGN PATENT DOCUMENTS

| | | |
|---|---|---|
| CN | 102439318 A | 5/2012 |
| CN | 103452883 A | 12/2013 |

(Continued)

OTHER PUBLICATIONS

European Patent Office, Rijswijk, Netherlands, International Search Report of International Application No. PCT/EP2019/054769, dated Jun. 12, 2019, 2 pages.

*Primary Examiner* — Thomas Fink
(74) *Attorney, Agent, or Firm* — Dickinson Wright PLLC

(57) ABSTRACT

A method for determining the operating point of an electric motor-driven fan in a system that includes determining the operating point of a fan when a clear correlation between the speed, the performance, and the volumetric flow rate of the fan is not possible.

15 Claims, 12 Drawing Sheets

(56) References Cited

U.S. PATENT DOCUMENTS

2013/0015251 A1* 1/2013 Bloemendaal .......... A01F 25/22
236/49.3

FOREIGN PATENT DOCUMENTS

| CN | 104791281 A | 7/2015 |
| --- | --- | --- |
| DE | 2502444 A1 | 6/1976 |
| DE | 19506790 A1 | 9/1995 |
| DE | 19726547 A1 | 1/1999 |
| DE | 10154783 A1 | 5/2003 |
| DE | 102011106962 A1 | 2/2012 |
| EP | 2508811 A1 | 10/2012 |
| WO | 2013052517 A2 | 4/2013 |
| WO | 2015058945 A1 | 4/2015 |

* cited by examiner

METHOD FOR DETERMINING THE OPERATING POINT

CROSS REFERENCE TO RELATED APPLICATIONS

This application is a 35 U.S.C. § 371 national phase application of International Application No.: PCT/EP2019/054769, filed Feb. 26, 2019, which claims the benefit of priority under 35 U.S.C. § 119 to German Patent Application No.: 10 2018 104 394.5, filed Feb. 27, 2018, the contents of which are incorporated herein by reference in their entirety.

FIELD

The invention relates to a method for determining the operating point of a fan. More particularly, the invention relates to a method for determining the operating point of a fan when a clear correlation between the speed, the performance, and the volumetric flow rate of the fan is not possible.

BACKGROUND

The statements in this section merely provide background information related to the present disclosure and several definitions for terms used in the present disclosure and may not constitute prior art.

The "fan curve" illustrates the dependent relationship between volumetric flow rate and pressure increase. The progression of the fan curve is dependent on the design of the fan. Fan curves are typically measured and recorded on a fan test rig suitable for this purpose. It is important to note, however, that these curves have typically been measured under ideal conditions on individual, free-standing representative blowers of a fan model series, with an unobstructed flow. Actual curves under installed conditions may deviate from these. The system curve represents the flow resistance of a system, against which the fan must operate. The operating point of a fan, which is used in a practical application, is the point at which fan curve and system curve intersect.

A distinction is made between a clear correlation between the speed, the performance, and the volumetric flow rate or pressure of the fan and no such clear correlation. When there is a clear correlation, the operating point can be determined as soon as the motor parameters are established, since the operating point is located at only one possible point at which fan curve and system curve intersect (operating point). If the correlation is unclear, the fan could theoretically be at several operating points after the motor parameters are established, since no information about the volumetric flow rate is available. It is unclear which of the operating points that might be, because without a sensor, only the motor parameters can be measured and verified.

For practical applications, it is necessary to ascertain the volumetric flow rate and thus the operating point of a fan. For this purpose, sensor-based methods are available, which are capable of approximating the volumetric flow rate of the fan. One widely used method for determining the volumetric flow rate, for example, is the differential pressure measurement method. Using pressure tap ports, pressure hoses, and a pressure sensor, the differential pressure between the intake nozzle of the fan and a reference point in the system can be determined. The measured pressure difference is proportional to the product of air density and the square of the volumetric flow rate. This can in turn be used to determine the volumetric flow rate of the fan in its installed state in the system. Once the volumetric flow rate in a practical application has been ascertained, the operating point can be determined using a set of characteristic fan curves, measured previously.

However, due to a high assembly effort, additional material costs, and a somewhat insufficient accuracy of volumetric flow rate determination, this solution is unreliable and expensive.

Known from EP 2 508 811 B1 is a device for determining the volumetric flow rate transported by a fan, which device is provided in the region of an inlet nozzle of the fan, along with a differential pressure sensor for connecting a measurement opening to a reference tube.

To guarantee optimal operation, however, it must be possible to clearly correlate a pressure increase to the volumetric flow rate at every duty point of the fan, i.e., the fan must be capable of operating according to a constant curve.

SUMMARY

An objective of the present disclosure is to propose a universally applicable method for determining the operating point of a fan, more particularly a method for determining the operating point of a fan when a clear correlation between the speed, the performance, and the volumetric flow rate of the fan is not possible.

This objective is achieved by the combination of the following features in a method for determining the operating point of an electric motor-driven fan in a system. This method generally comprises at least one startup of the fan, wherein based on motor parameters of the fan, an operating point A of the fan is determined from the at least one startup.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

Figure 1:
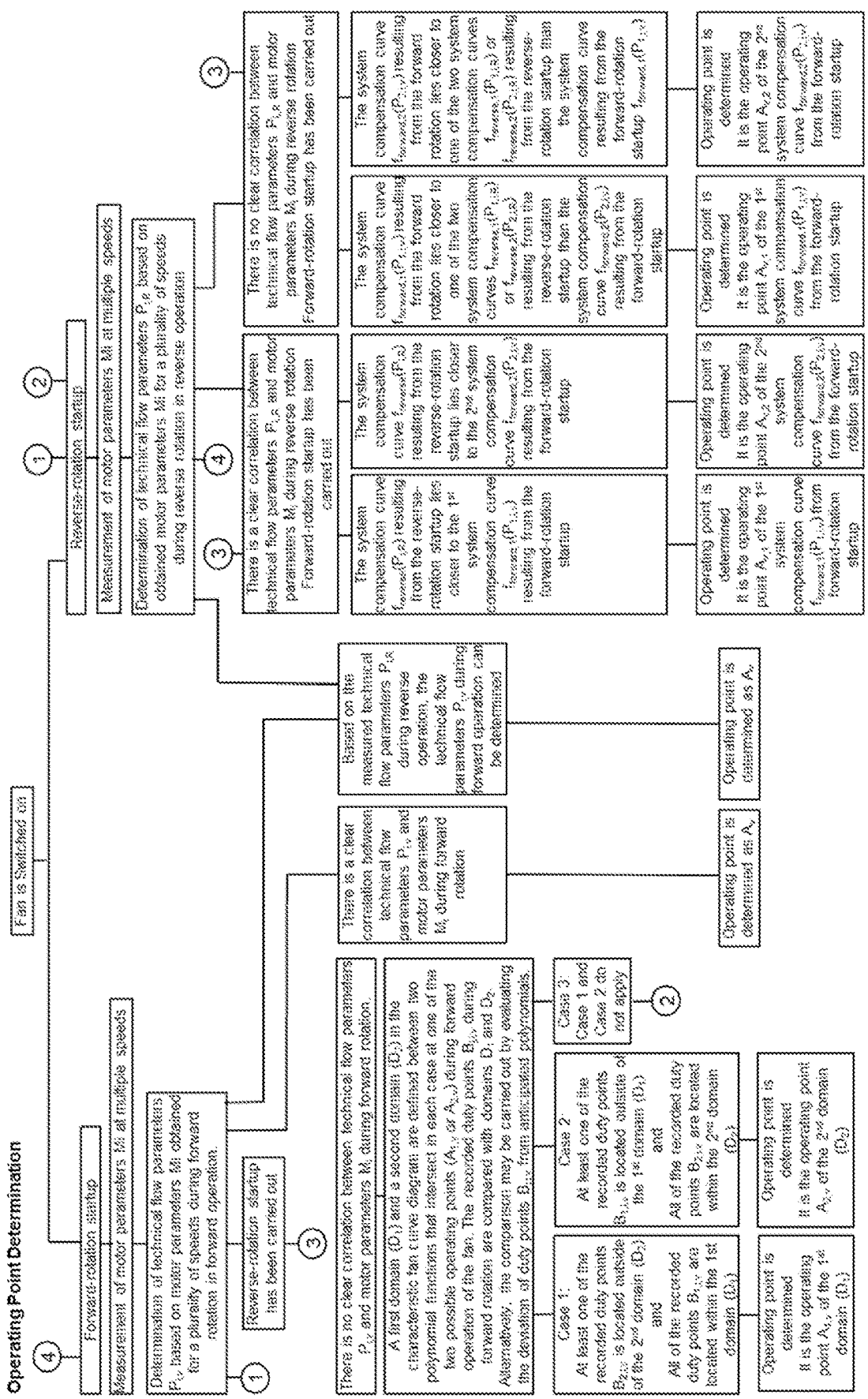
FIG. 1 is a flow chart of a process sequence according to the teachings of the present disclosure.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

A fundamental concept of the present disclosure involves the provision of a universal solution for different fan designs, in which the operating point A is determined based on motor parameters M by means of startups.

According to the present disclosure, a method for determining the operating point of an electric motor-driven fan in a system is provided, wherein the method comprises at least one startup of the fan. Based on motor parameters M (e.g. speed, performance, current, torque) of the fan, the operating point of the fan can be determined from at least one of these startups. During the startup, the motor parameters Mi at multiple speeds are measured. From these parameters, the technical flow parameters P (e.g. volumetric flow rate, pressure) are determined, preferably from measured characteristic curves for the fan consisting of technical flow parameters and motor parameters, or by applying the relevant fan laws.

As the startup, either a forward-rotation startup or a reverse-rotation startup may be carried out to determine the operating point. In some cases, two startups may be required to determine the operating point. The sequence of the startups is of no importance.

In the case of forward rotation, one or more operating points are approached by increasing or decreasing the speed of the fan along a system curve. The direction of rotation may be obtained from the specifications for the fan and corresponds to the direction of rotation during operation.

In the case of reverse rotation, one or more operating points are approached by increasing or decreasing the speed of the fan along a system curve. The direction of rotation is opposite the direction of rotation of the fan during operation.

If a clear correlation between the technical flow parameters $P_{i,v}$ and the motor parameters $M_{i,v}$ during forward rotation is possible, the operating point can be determined as $A_v$.

If a clear correlation between the technical flow parameters $P_{i,R}$ and the motor parameters $M_{i,R}$ during reverse rotation is possible, the operating point can be determined as $A_v$.

If a clear correlation between the technical flow parameters $P_{i,v}$ and the motor parameters $M_{i,v}$ during forward rotation is not possible, a first domain $D_1$ and a second domain $D_2$ are defined in the characteristic curve diagram for the fan, each domain being bound by two polynomial functions (e.g. by a parabola through the origin and a straight line through the origin), which intersect at the two possible operating points $A_{1,v}$ and $A_{2,v}$, respectively, during forward operation of the fan.

The duty points $B_{j,i,V}$ recorded during forward rotation are compared with the domains D1 and D2. If at least one of the recorded duty points $B_{1,i,v}$ (i=1, . . . , m−1) lies outside of the defined first domain D1, and further, if all of the recorded duty points $B_{2,i,v}$ (i=1, . . . , m−1) lie within the second domain D2, the operating point is determined as $A_{2,v}$.

If at least one of the recorded duty points $B_{2,i,v}$ (i=1, . . . , m−1) lies outside of the defined second domain D2, and further, if all of the recorded duty points $B_{1,i,v}$ (i=1, . . . , m−1) lie within the first domain D1, the operating point is determined as $A_{1,v}$.

If a clear correlation between the technical flow parameters $P_{i,R}$ and the motor parameters $M_{i,R}$ during reverse rotation is possible, and if a forward-rotation startup has been carried out, then the system compensation curve $f_{forward,1}(P_{1,i,v})$ through the duty points $B_{1,i,v}$ and the system compensation curve $f_{forward,2}(P_{2,i,v})$ through the duty points $B_{2,i,v}$ from the forward rotation and the system compensation curve $f_{reverse}(P_{i,R})$ through the duty points $B_{i,R}$ from the reverse rotation are used to determine the operating point.

If the system compensation curve $f_{reverse}(P_{i,R})$ that results from the reverse rotation lies closer to the system compensation curve $f_{forward,1}(P_{1,i,v})$ than it does to the system compensation curve $f_{forward,2}(P_{2,i,v})$, then the operating point $A_{1,v}$ is determined to be the operating point.

If the system compensation curve $f_{reverse}(P_{i,R})$ that results from the reverse rotation lies closer to the system compensation curve $f_{forward,2}(P_{2,i,v})$ than it does to the system compensation curve $f_{forward,1}(P_{2,i,v})$, then the operating point $A_{2,v}$ is determined to be the operating point.

If a clear correlation between the technical flow parameters $P_{i,R}$ and the motor parameters $M_{i,R}$ during reverse rotation is not possible, and if a forward-rotation startup has already been carried out, then a first system compensation curve $f_{forward,1}(P_{1,i,v})$ through the duty points $B_{1,i,v}$ and a second system compensation curve $f_{forward,2}(P_{2,i,v})$ through the duty points $B_{2,i,v}$ from the forward-rotation startup, and a first system compensation curve $f_{reverse,1}(P_{1,i,R})$ through the duty points $B_{1,i,R}$ and a second system compensation curve $f_{reverse,2}(P_{2,i,R})$ through the duty points $B_{2,i,R}$ from the reverse-rotation startup are used to determine the operating point.

If the system compensation curve $f_{forward,1}(P_{i,v})$ lies closer to one of the two system compensation curves $f_{reverse,1}(P_{1,i,R})$ and $f_{reverse,2}(P_{2,i,R})$ than the system compensation curve $f_{forward,2}(P_{2,i,v})$ lies to the system compensation curves $f_{reverse,1}(P_{1,i,R})$ and $f_{reverse,2}(P_{2,i,R})$, then the operating point $A_{1,V}$ is determined to be the operating point.

If the system compensation curve $f_{forward,2}(P_{2,i,v})$ lies closer to one of the two system compensation curves $f_{reverse,1}(P_{1,i,R})$ and $f_{reverse,2}(P_{2,i,R})$ than the system compensation curve $f_{forward,1}(P_{1,i,v})$ lies to the system compensation curves $f_{reverse,1}(P_{1,i,R})$ and $f_{reverse,2}(P_{2,i,R})$, then the operating point $A_{2,V}$ is determined to be the operating point.

Other advantageous refinements of the present disclosure are specified and/or described in greater detail in the following, together with a description of several embodiments, with reference being made to the figures.

Figure 2:
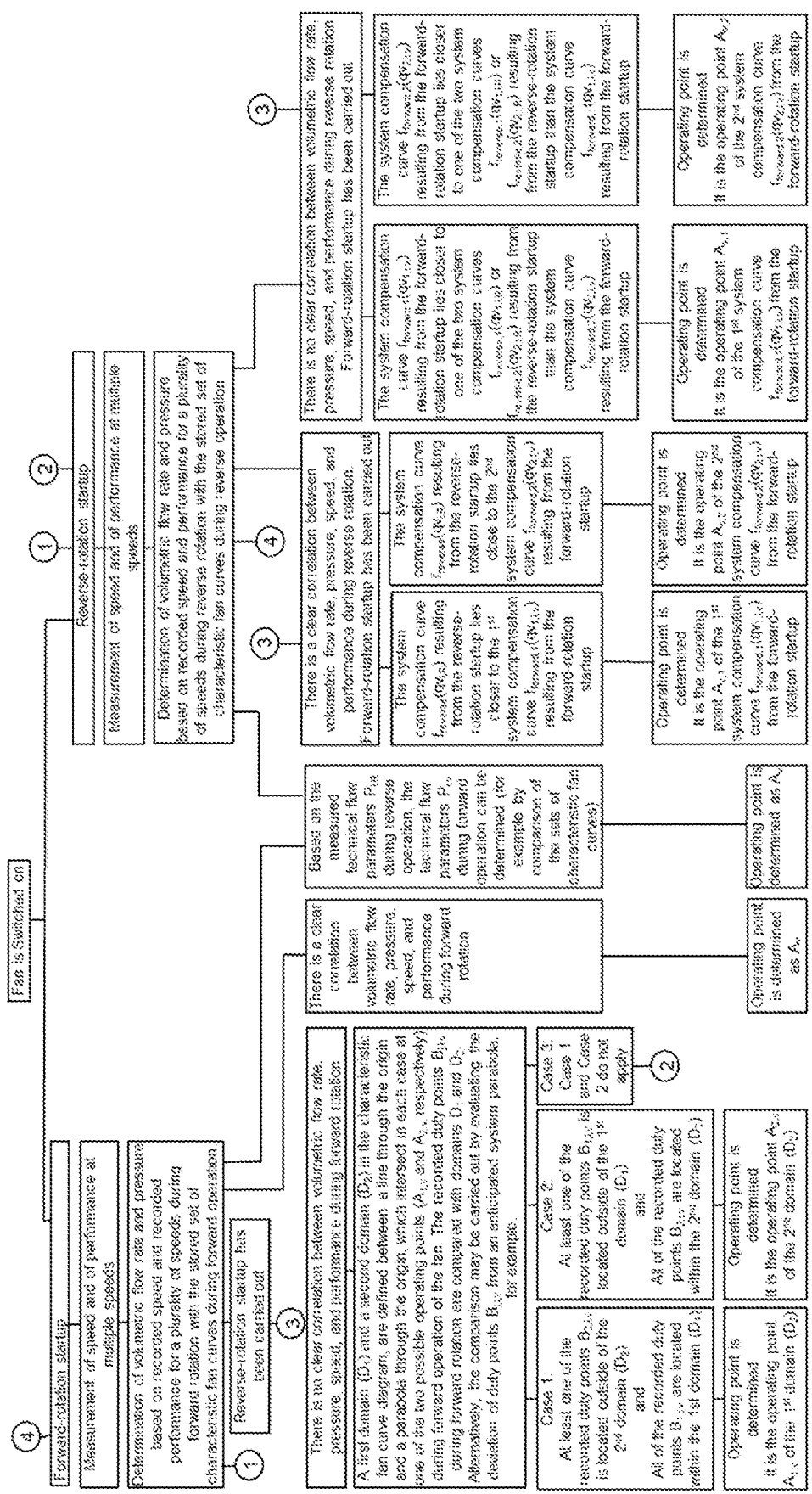
FIG. 2 is another flow chart of a process sequence according to the teachings of the present disclosure.

Referring to FIG. 1, a flow chart illustrating the process sequence of the method for determining the operating point of the fan is provided. In FIG. 2, another flow chart illustrating the process sequence of the method for determining the operating point of the fan based on an exemplary embodiment is provided.

Figure 3:
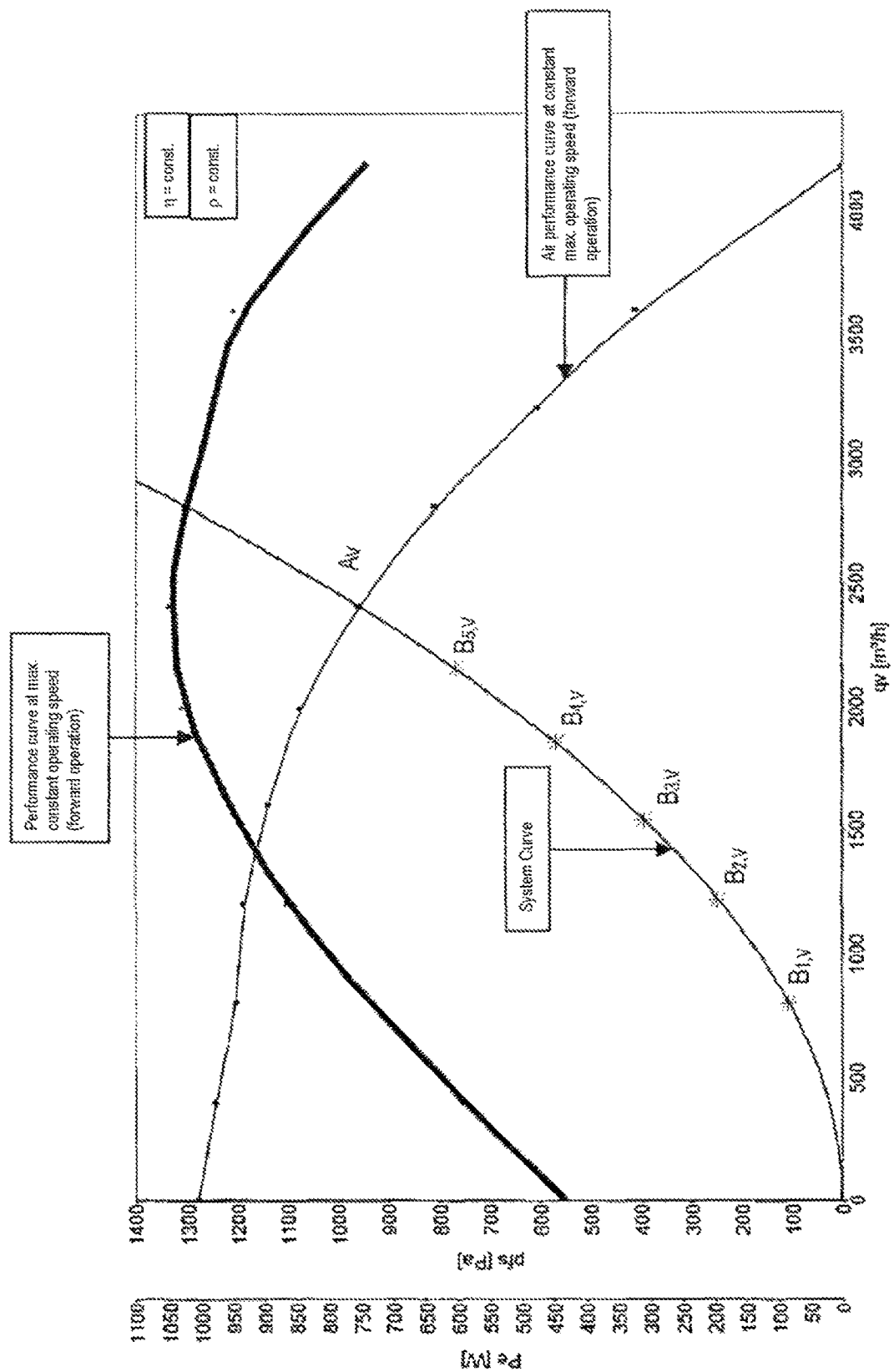
FIG. 3 to FIG. 11 are diagrams showing characteristic curves of a fan under different conditions.
Figure 4:
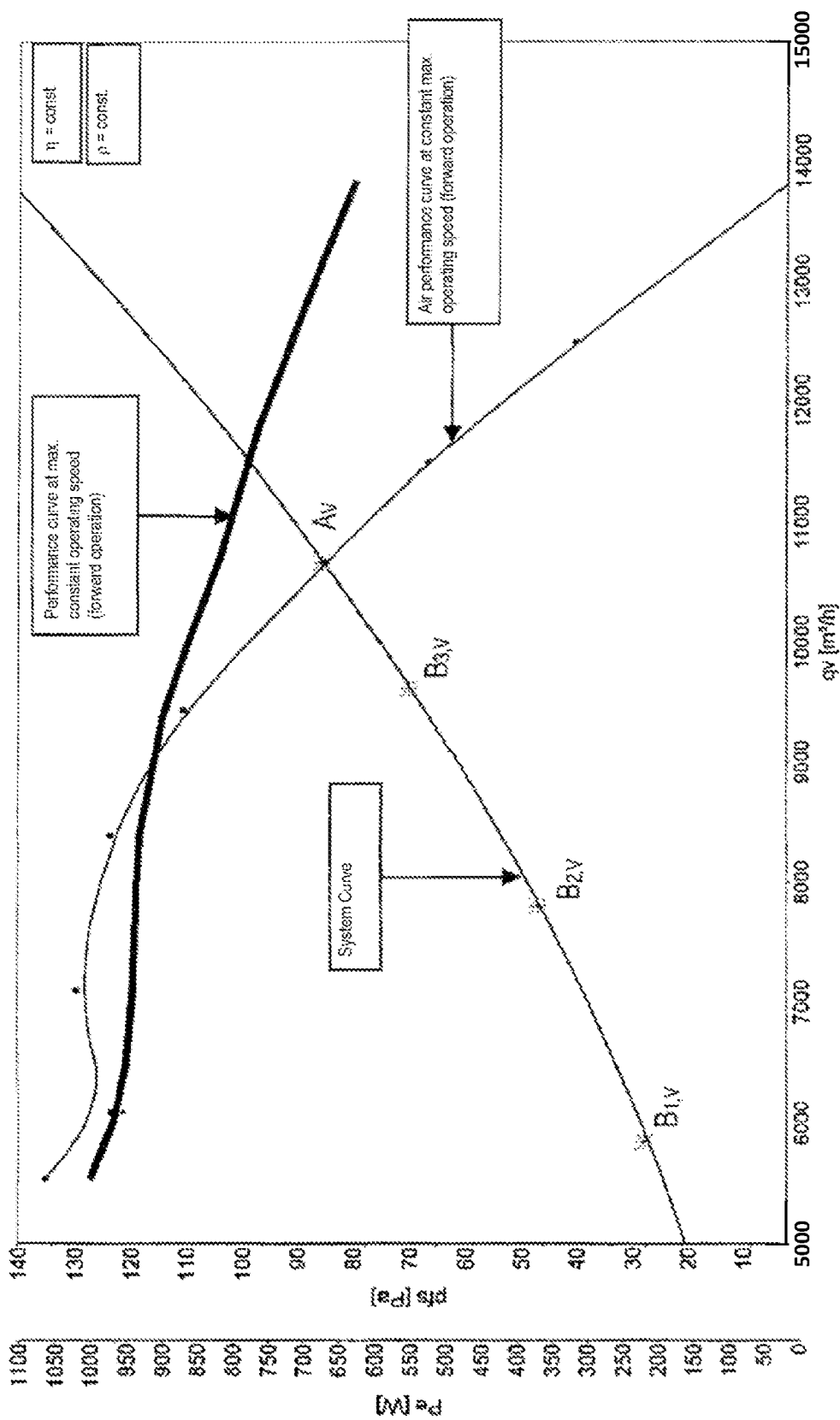
Figure 5:
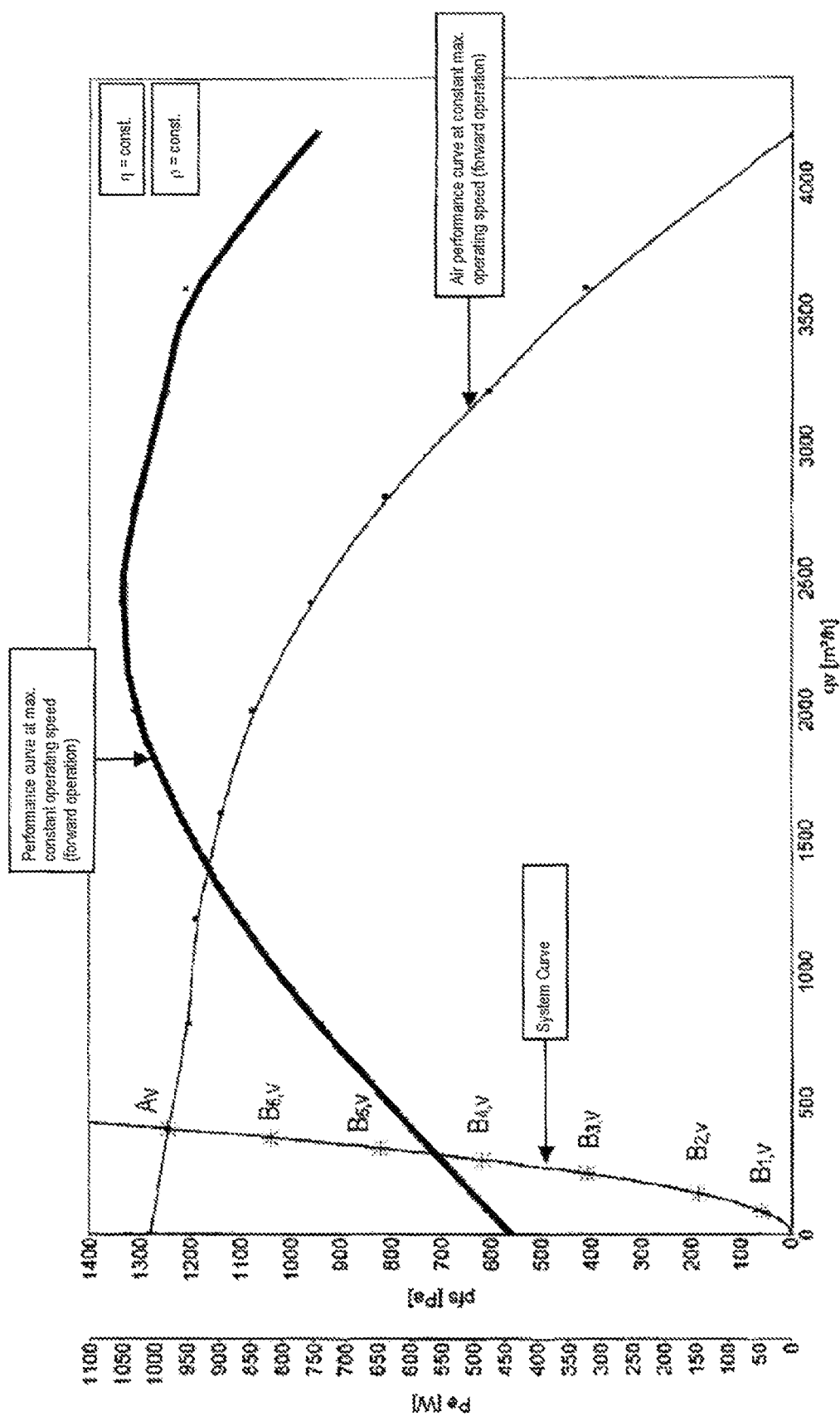

Referring now to FIG. 3, a diagram showing various characteristic curves of an exemplary fan, a plurality of recorded duty points $B_{i,v}$ (i=1, . . . , m−i) during forward rotation, and the operating point Av during the forward rotation. A similar diagram is shown in FIG. 4 for a first exemplary embodiment. In FIG. 5, another diagram showing various characteristic curves of an exemplary fan, a plurality of recorded duty points $B_{i,v}$ (i=1, . . . , m−i) during forward rotation, and the unambiguous operating point Av during the forward rotation is provided for a second exemplary embodiment.

Figure 6:
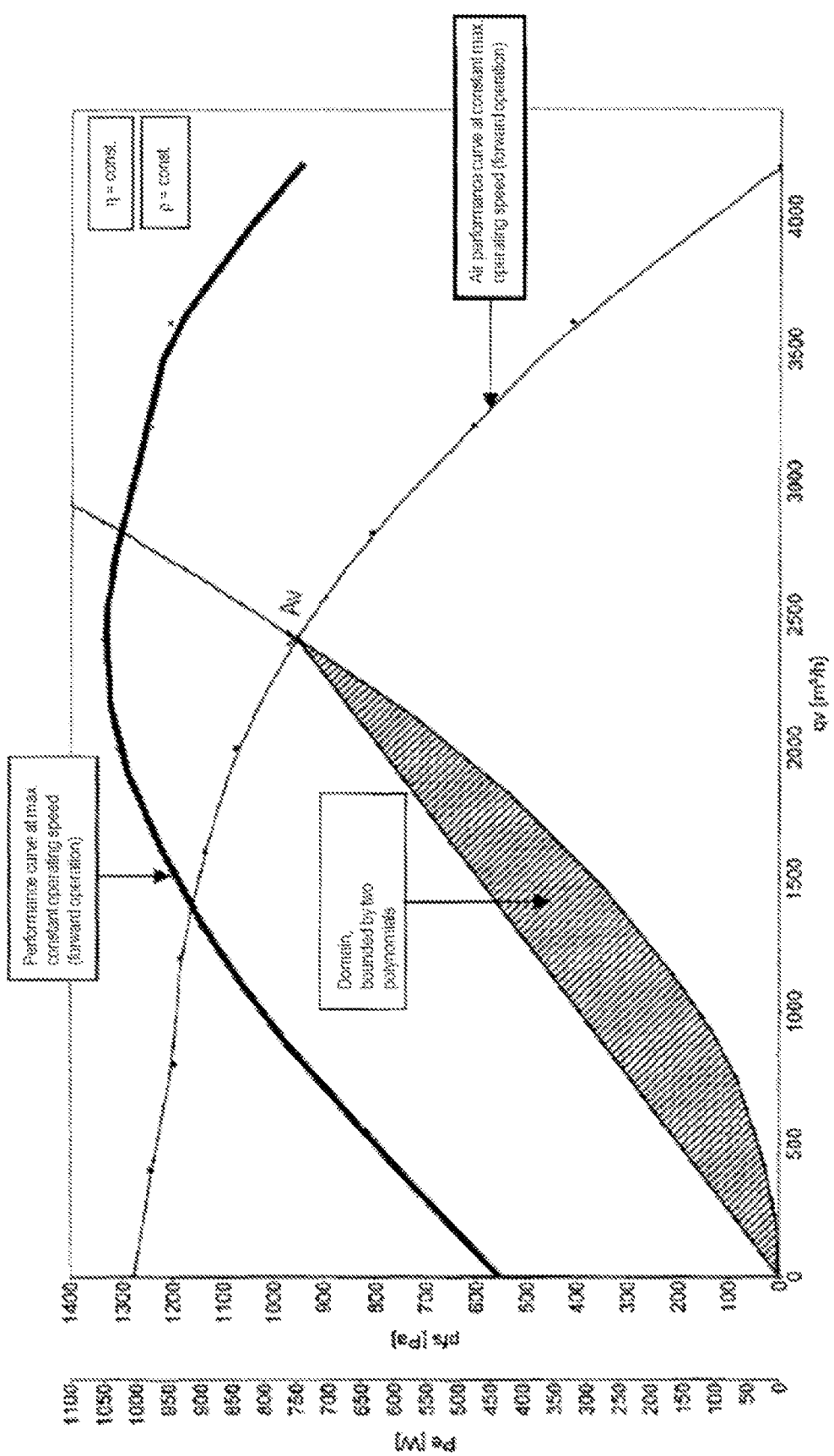

Referring now to FIG. 6, a diagram is provided that illustrates various characteristic curves of an exemplary fan, an operating point Av during forward rotation, and a domain bounded by two polynomials, e.g. a line through the origin and a parabola through the origin.

Figure 7:
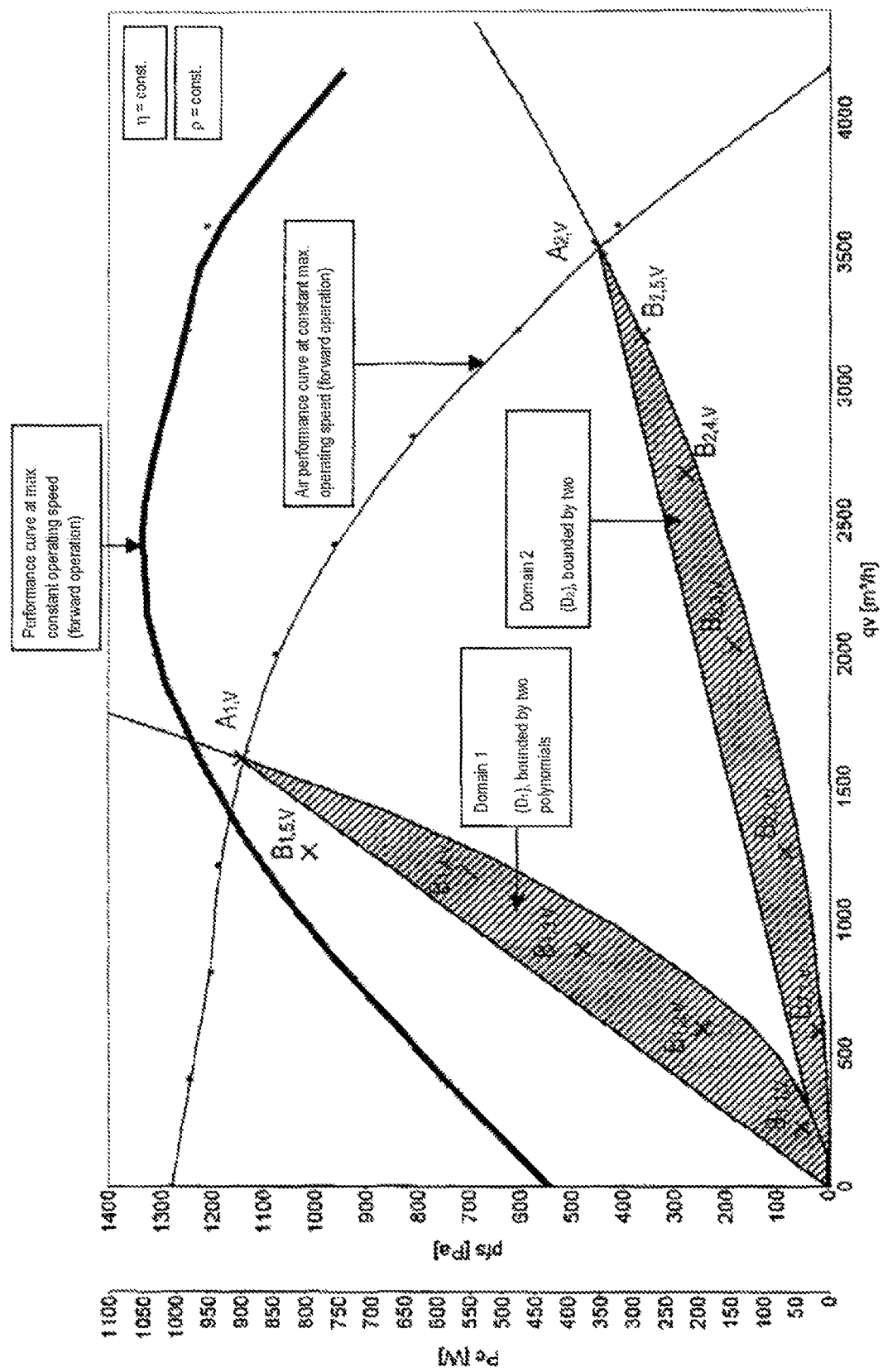
Figure 8:
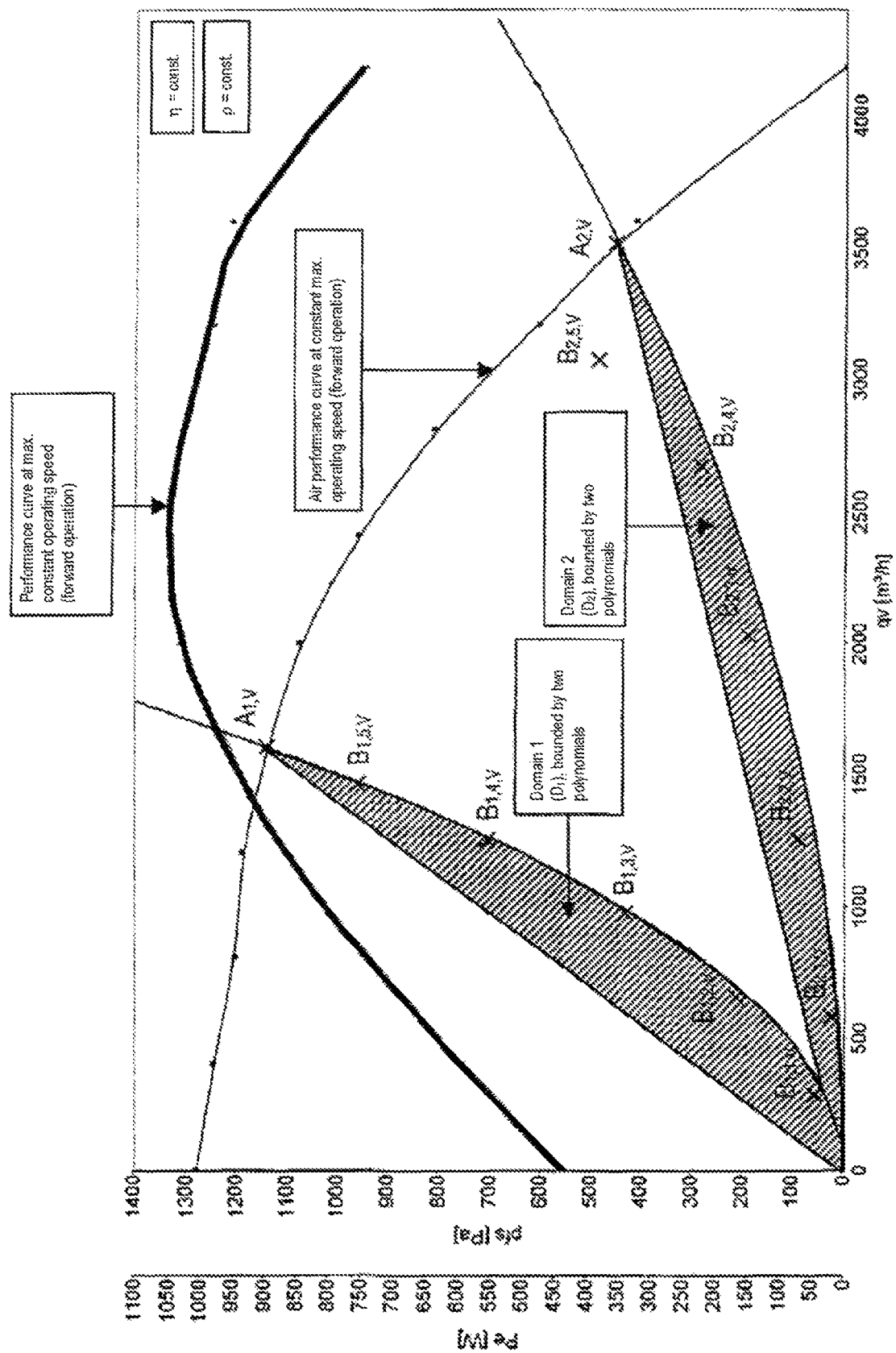

In FIG. 7, a diagram is provided that shows various characteristic curves of an exemplary fan, a plurality of recorded duty points $B_{j,i,v}$ (j=1.2; i=1, . . . , m−1) during forward rotation, an operating point $A_{1,v}$ and an operating point $A_{2,v}$ during forward rotation, a first domain D1, which is bounded by two polynomials, and a second domain D2, which is bounded by two polynomials according to the first exemplary embodiment. A similar diagram is provided in FIG. 8, that illustrates various characteristic curves of an exemplary fan, a plurality of recorded duty points $B_{j,i,v}$ (j=1, 2; i=1, . . . , m−1) during forward rotation, a possible operating point $A_{1,v}$ and an operating point $A_{2,v}$ during forward rotation, a first domain D1, which is bounded by two polynomials, and a second domain D2, which is bounded by two polynomials according to the second exemplary embodiment.

Figure 9:
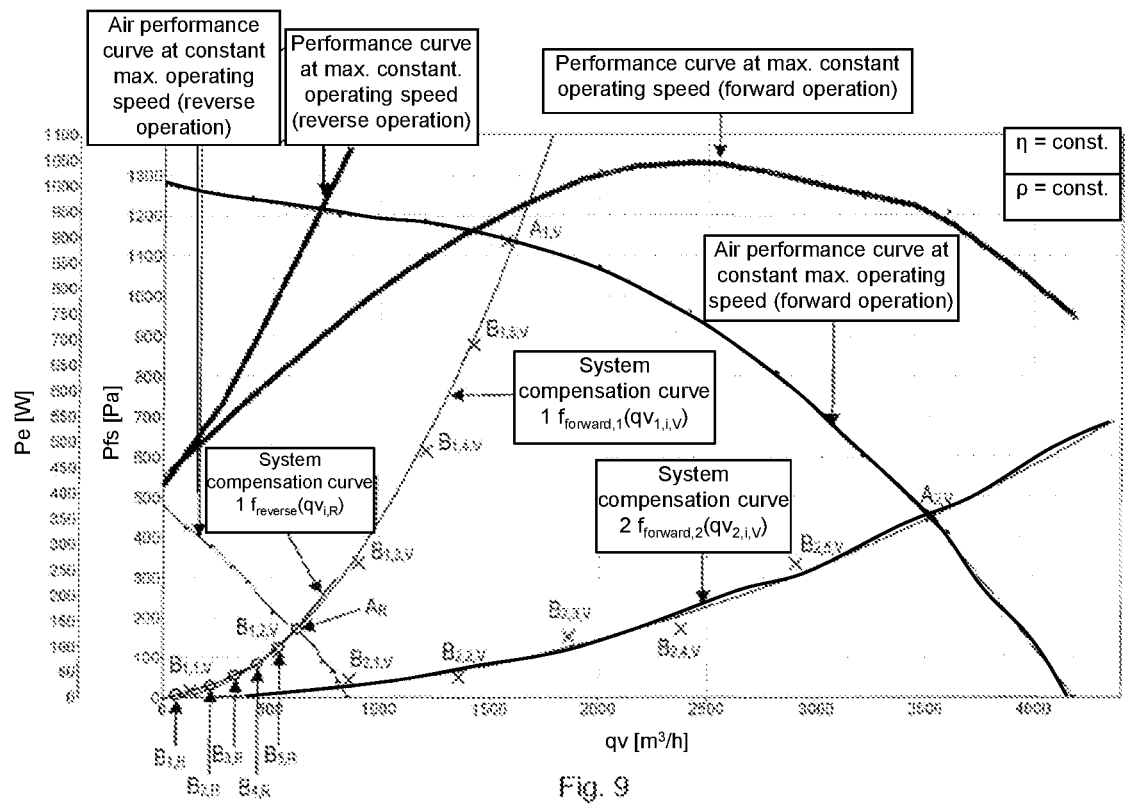

Referring now to FIG. 9, a diagram is provided that shows various characteristic curves of an exemplary fan, a plurality of recorded duty points $B_{j,i,v}$ (j=1, 2; i=1, . . . , m−1) during forward rotation, a plurality of recorded duty points $B_{i,R}$ (i=1, . . . , k−1) during reverse rotation, an operating point $A_{1,v}$ and an operating point $A_{2,v}$ during forward rotation, an operating point $A_R$ during reverse rotation, and in each case a system compensation curve through the duty points $B_{1,i,v}$, $B_{2,i,v}$, $B_{i,R}$ according to the first exemplary embodiment.

Figure 10:
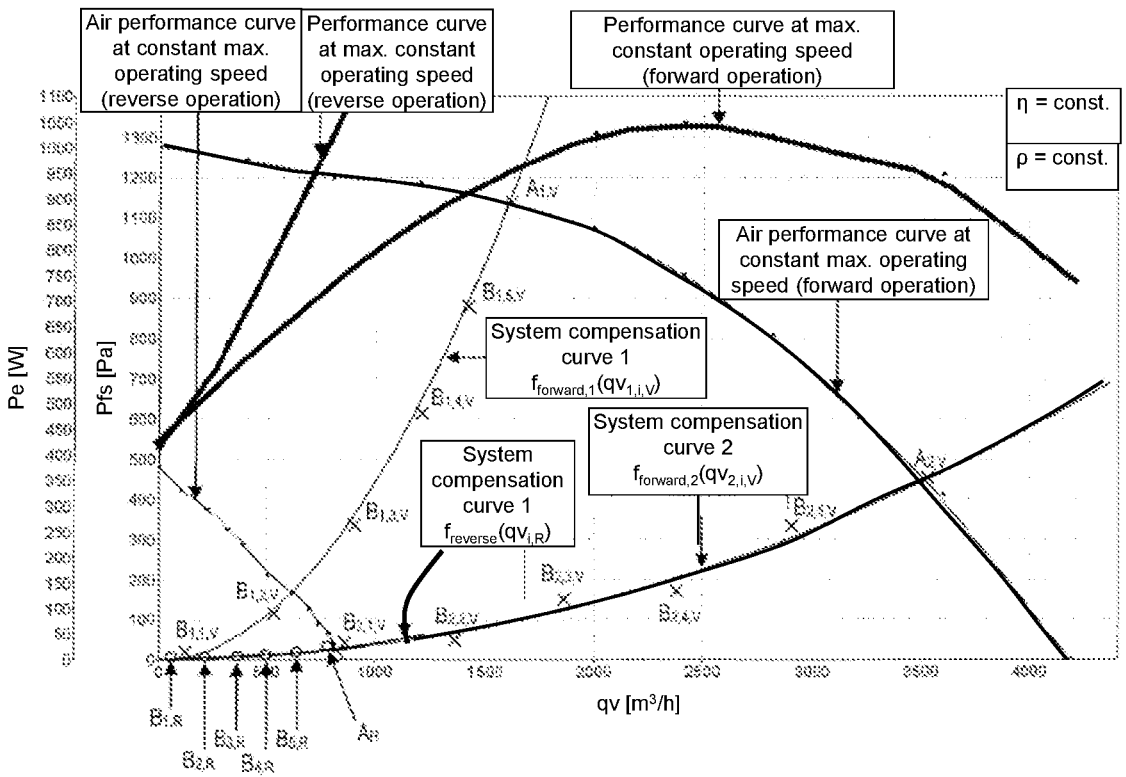

In FIG. 10, a diagram is provided that illustrates various characteristic curves of an exemplary fan, a plurality of recorded duty points $B_{j,i,v}$ (j=1, 2; i=1, . . . , m−1) during forward rotation, a plurality of recorded duty points $B_{i,R}$ (i=1, . . . , k−1) during reverse rotation, an operating point $A_{1,v}$ and an operating point $A_{2,v}$ during forward rotation, an operating point $A_R$ during reverse rotation, and in each case a system compensation curve through the duty points $B_{1,i,v}$, $B_{2,i,v}$, $B_{i,R}$ according to the second exemplary embodiment.

Figure 11:
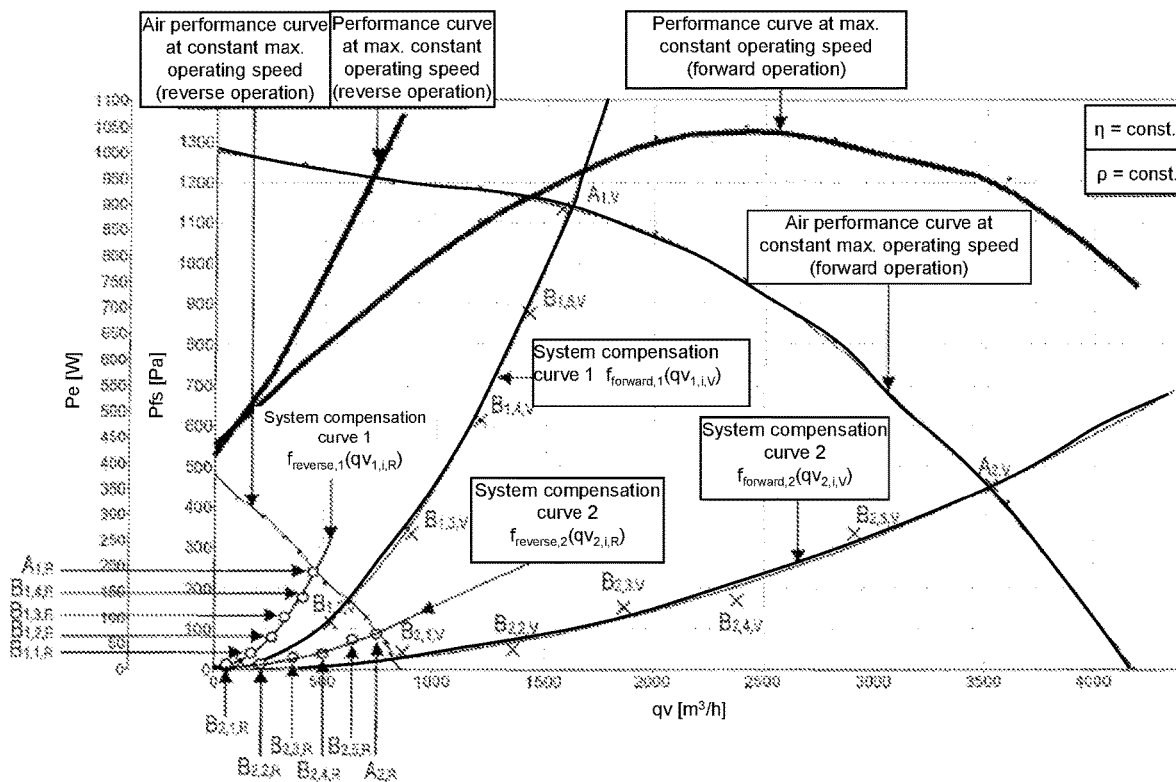

Referring now to FIG. 11, a diagram is provided that shows various characteristic curves of an exemplary fan, a plurality of recorded duty points $B_{j,i,v}$ (j=1, 2; i=1, . . . , m−1) during forward rotation, a plurality of recorded duty points $B_{j,i,R}$ (j=1, 2; i=1, . . . , k−1) during reverse rotation, an operating point $A_{1,v}$ and an operating point $A_{2,v}$ during forward rotation, an operating point $A_{1,R}$ during reverse rotation, and in each case a system compensation curve through the duty points $B_{1,i,v}$, $B_{2,i,v}$, $B_{2,i,R}$.

Figure 12:
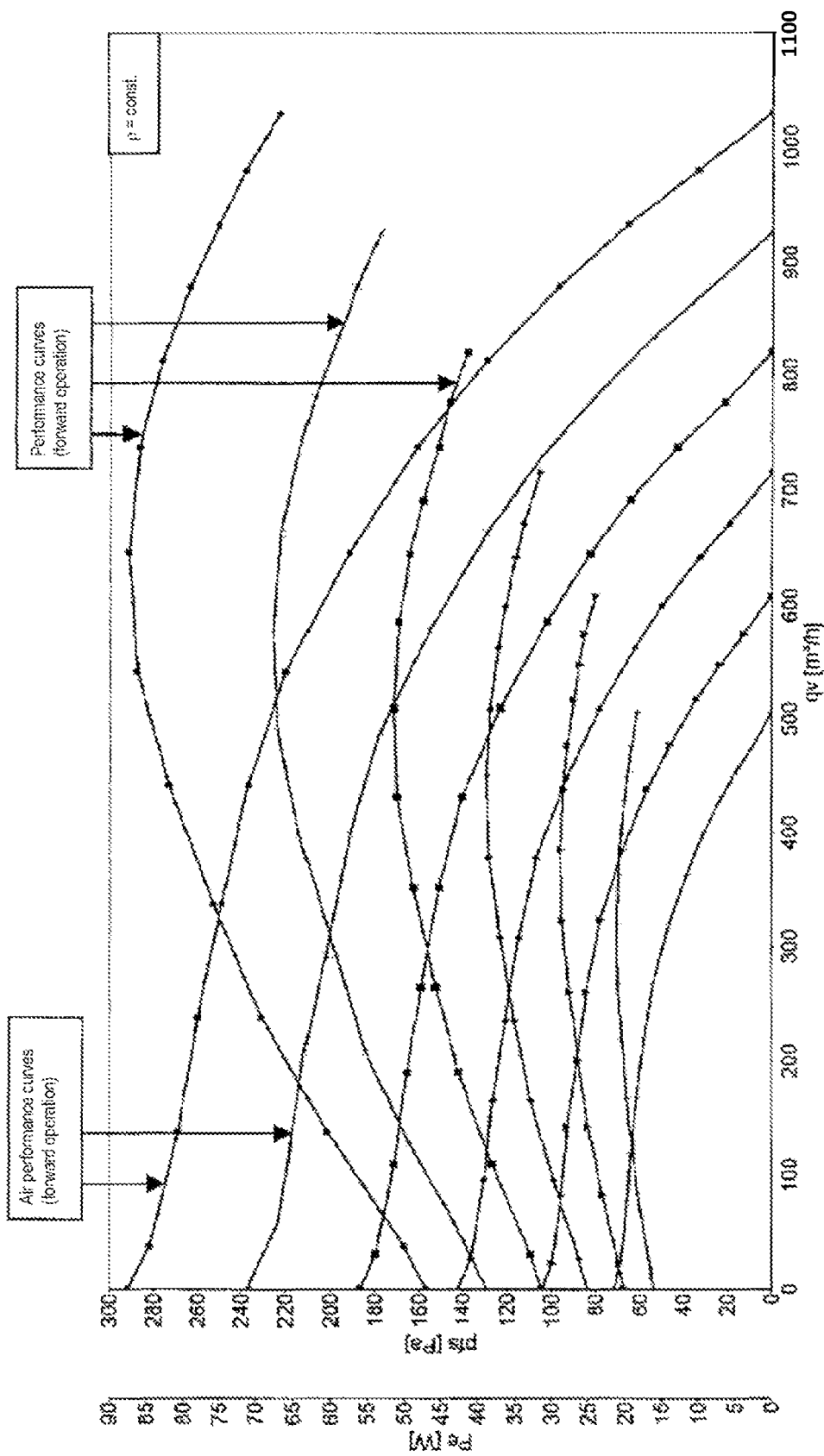
FIG. 12 is a set of characteristic fan curves with technical flow parameters and motor parameters during forward operation according to teachings of the present disclosure.

Referring now to FIG. 12, an exemplary set of characteristic fan curves is provided with technical flow parameters and motor parameters during forward operation, plotted over volumetric flow rate, pressure, and performance.

Figure 13:
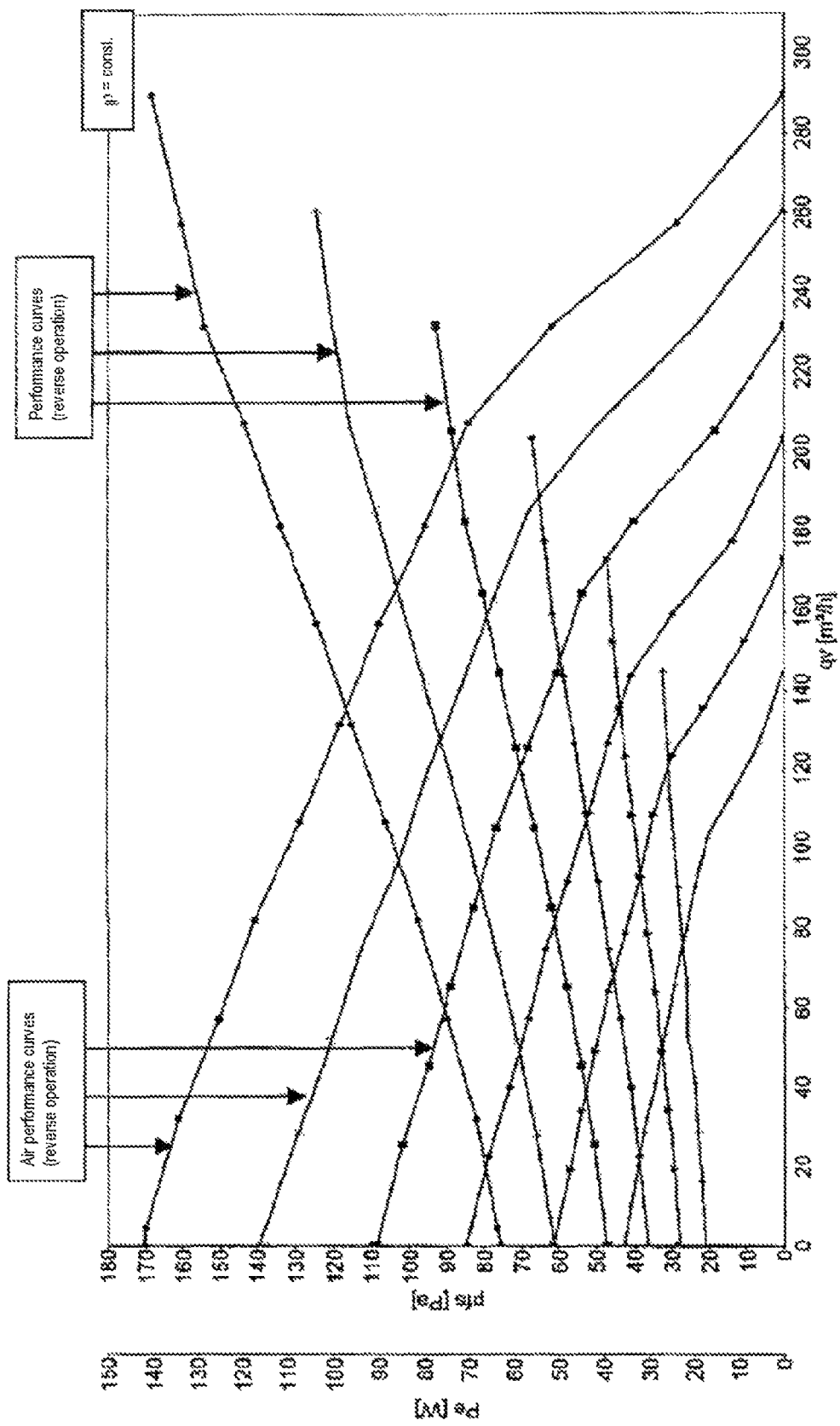
FIG. 13 is a set of characteristic fan curves with technical flow parameters and motor parameters during reverse operation according to the teachings of the present disclosure.

In FIG. 13, an exemplary set of characteristic fan curves is provided with technical flow parameters and motor parameters during reverse operation, plotted over volumetric flow rate, pressure, and performance.

While the above description constitutes the preferred embodiments of the present invention, it will be appreciated that the invention is susceptible to modification, variation and change without departing from the proper scope and fair meaning of the accompanying claims.

The invention claimed is:

1. A method for determining the operating point of an electric motor-driven fan in a system, wherein the method comprises:

providing at least one startup of the fan, the at least one startup being a forward-rotation startup or a reverse-rotation startup;

measuring motor parameters $M_i$ and/or $M_{i,R}$ for a plurality of speeds during the at least one startup; determining technical flow parameters $P_{i,v}$ and/or $P_{i,R}$ for the plurality of speeds; and determining a clear correlation between the technical flow parameters $P_{i,v}$ and the motor parameters during forward rotation is not possible or a clear correlation between the technical flow parameters $P_{i,R}$ and the motor parameters $M_{i,R}$ during reverse rotation is not possible, such that the operating point cannot be determined; and in response to determining the operating point cannot be determined, a first domain D1 and a second domain D2 are defined in a curve diagram for the fan, between two polynomial functions, which intersect in each case at one of two possible operating points $A_{1,v}$ and $A_{2,v}$, respectively, during forward operation of the fan; wherein $P_{i,v}$ is then referred to as $P_{j,i,v}$ with the subscript j being a 1 or 2 to reflect the first domain D1 or the second domain D2, and the subscript v refers to the forward-rotation startup and the subscript R refers to the reverse-rotation startup; wherein recorded duty points during forward rotation are compared with first domain D1 and second domain D2, the subscript j is a 1 or 2 to reflect the first domain D1 or the second domain D2, and i). a first determination is made that at least one of the recorded duty points or $B_{1,i,v}$ (i=1, . . . , m−1) lies outside of the defined first domain D1 and further, or a second determination is made that all of the recorded duty points (i=1, . . . , m−1) lie within the second domain D2, in response to the first or second determination, the operating point is determined as $A_{2,v}$, or ii). a third determination is made that at least one of the recorded duty points $B_{2,i,v}$ (i=1, . . . , m−1) lies outside of the defined second domain D2, or a fourth determination is made that all of the recorded duty points $B_{1,i,v}$ (i=1, . . . , m−1) lie within the first domain D1, in response to the third or fourth determination, the operating point is determined as $A_{1,v}$, wherein the subscript i refers to the plurality of speeds.

2. The method according to claim 1, wherein one startup is performed, and the one startup is a forward-rotation startup.

3. The method according to claim 1, wherein one startup is performed, and the one startup is a reverse-rotation startup.

4. The method according to claim 1, wherein two startups are performed, and the two startups correspond to a forward-rotation startup and a reverse-rotation startup, in a desired sequence.

5. The method according to claim 1, wherein a clear correlation between the technical flow parameters $P_{i,R}$ and the motor parameters $M_{i,R}$ exists during reverse rotation and a forward-rotation startup has been carried out, then a system compensation curve $f_{forward,1}(P_{1,i,v})$ through duty points $B_{1,i,v}$ and a system compensation curve $f_{forward,2}(P_{2,i,v})$ through duty points $B_{2,i,v}$ from the forward-rotation startup and a system compensation curve $f_{reverse}(P_{i,R})$ through duty points $B_{i,R}$ from the reverse-rotation startup are used to determine the operating point.

6. The method according to claim 2, wherein no clear correlation between the technical flow parameters $P_{i,v}$ and the motor parameters $M_{i,v}$ during forward rotation exists, a first domain D1 and a second domain D2 are defined in a curve diagram for the fan, in each case between two polynomial functions, which intersect in each case at one of two possible operating points $A_{1,v}$ and $A_{2,v}$, respectively, during forward operation of the fan;

wherein $P_{i,v}$ may be written as $P_{j,i,v}$ with the subscript j being a 1 or 2 to reflect the first domain D1 or the second domain D2.

7. The method according to claim 3, wherein no clear correlation between the technical flow parameters $P_{i,v}$ and the motor parameters $M_{i,v}$ during forward rotation exists, a first domain D1 and a second domain D2 are defined in a curve diagram for the fan, in each case between two polynomial functions, which intersect in each case at one of two possible operating points $A_{1,v}$ and $A_{2,v}$, respectively, during forward operation of the fan;

wherein $P_{i,v}$ may be written as $P_{j,i,v}$ with the subscript j being a 1 or 2 to reflect the first domain D1 or the second domain D2.

8. The method according to claim 4, wherein no clear correlation between the technical flow parameters $P_{i,v}$ and the motor parameters $M_{i,v}$ during forward rotation exists, a first domain D1 and a second domain D2 are defined in a curve diagram for the fan, in each case between two polynomial functions, which intersect in each case at one of two possible operating points $A_{1,v}$ and $A_{2,v}$, respectively, during forward operation of the fan;

wherein $P_{i,v}$ may be written as $P_{j,i,v}$ with the subscript j being a 1 or 2 to reflect the first domain D1 or the second domain D2.

9. The method according to claim 6, wherein recorded duty points $B_{j,i,v}$ during forward rotation are compared with first domain D1 and second domain D2, wherein the subscript j is a 1 or 2 to reflect the first domain D1 or the second domain D2, and when at least one of the recorded duty points $B_{1,i,v}$ (i=1, ..., m−1) lies outside of the defined first domain D1 and further, when all of the recorded duty points $B_{2,i,v}$ (i=1, ..., m−1) lie within the second domain D2, the operating point is determined as $A_{2,v}$, and when at least one of the recorded duty points $B_{2,i,v}$ (i=1, ..., m−1) lies outside of the defined second domain D2, and further, when all of the recorded duty points $B_{1,i,v}$ (i=1, ..., m−1) lie within the first domain D1, the operating point is determined as $A_{1,v}$.

10. The method according to claim 9, wherein a clear correlation between the technical flow parameters $P_{i,R}$ and the motor parameters $M_{i,R}$ during reverse rotation exists and a forward-rotation startup has been carried out, then a system compensation curve $f_{forward,1}(P_{1,i,v})$ through duty points $B_{1,i,v}$ and a system compensation curve $f_{forward,2}(P_{2,i,v})$ through duty points $B_{2,i,v}$ from the forward-rotation startup and a system compensation curve $f_{reverse}(P_{i,R})$ through duty points $B_{i,R}$ from the reverse-rotation startup are used to determine the operating point.

11. The method according to claim 7, wherein recorded duty points $B_{j,i,v}$ during forward rotation are compared with first domain D1 and second domain D2, wherein the subscript j is a 1 or 2 to reflect the first domain D1 or the second domain D2, and when at least one of the recorded duty points $B_{1,i,v}$ (i=1, ..., m−1) lies outside of the defined first domain D1 and further, when all of the recorded duty points $B_{2,i,v}$ (i=1, ..., m−1) lie within the second domain D2, the operating point is determined as $A_{2,v}$, and when at least one of the recorded duty points $B_{2,i,v}$ (i=1, ..., m−1) lies outside of the defined second domain D2, and further, when all of the recorded duty points $B_{1,i,v}$ (i=1, ..., m−1) lie within the first domain D1, the operating point is determined as $A_{1,v}$.

12. The method according to claim 11, wherein a clear correlation between the technical flow parameters $P_{i,R}$ and the motor parameters $M_{i,R}$ during reverse rotation exists and a forward-rotation startup has been carried out, then a system compensation curve $f_{forward,1}(P_{1,i,v})$ through duty points $B_{1,i,v}$ and a system compensation curve $f_{forward,2}(P_{2,i,v})$ through duty points $B_{2,i,v}$ from the forward-rotation startup and a system compensation curve $f_{reverse}(P_{i,R})$ through duty points $B_{i,R}$ from the reverse-rotation startup are used to determine the operating point.

13. The method according to claim 8, wherein recorded duty points $B_{j,i,v}$ during forward rotation are compared with first domain D1 and second domain D2, wherein the subscript j is a 1 or 2 to reflect the first domain D1 or the second domain D2, and when at least one of the recorded duty points $B_{1,i,v}$ (i=1, ..., m−1) lies outside of the defined first domain D1 and further, when all of the recorded duty points $B_{2,i,v}$ (i=1, ..., m−1) lie within the second domain D2, the operating point is determined as $A_{2,v}$, and when at least one of the recorded duty points $B_{2,i,v}$ (i=1, ..., m−1) lies outside of the defined second domain D2, and further, when all of the recorded duty points $B_{1,i,v}$ (i=1, ..., m−1) lie within the first domain D1, the operating point is determined as $A_{1,v}$.

14. The method according to claim 13, wherein a clear correlation between the technical flow parameters $P_{i,R}$ and the motor parameters $M_{i,R}$ during reverse rotation exists and a forward-rotation startup has been carried out, then a system compensation curve $f_{forward,1}(P_{1,i,v})$ through duty points $B_{1,i,v}$ and a system compensation curve $f_{forward,2}(P_{2,i,v})$ through duty points $B_{2,i,v}$ from the forward-rotation startup and a system compensation curve $f_{reverse}(P_{i,R})$ through duty points $B_{i,R}$ from the reverse-rotation startup are used to determine the operating point.

15. A method for determining the operating point of an electric motor-driven fan in a system, wherein the method comprises:

providing first startup of the fan, the first startup being a forward-rotation startup or a reverse-rotation startup;

measuring motor parameters $M_{i,v}$ or $M_{i,R}$ for a plurality of speeds during the startup;

determining technical flow parameters $P_{i,v}$ or $P_{i,R}$ for the plurality of speeds; and determining that a clear correlation between the technical flow parameters $P_i$ and the motor parameters $M_i$ does not exist such that a determination of the operating point is not possible, and in response providing a second startup of the fan, the second startup being opposite in direction of the first startup; and determining an operating point of the fan based on the motor parameters measured from the first start up and the second startup;

wherein the subscript i refers to the plurality of speeds, the subscript v refers to the forward-rotation startup and the subscript R refers to the reverse-rotation startup.

* * * * *